UNITED STATES PATENT OFFICE.

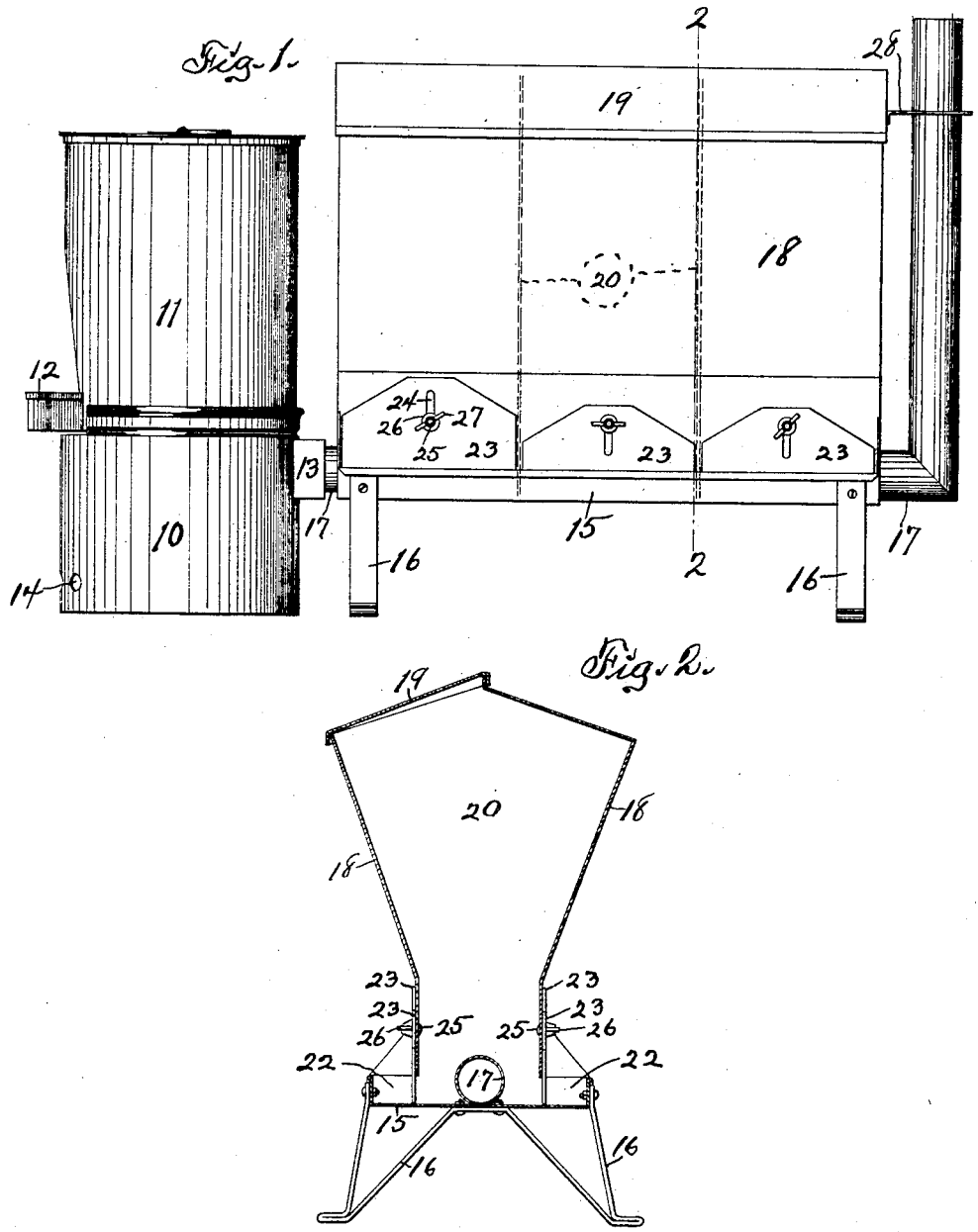

W FRANK EASTER, OF MARSHALLTOWN, IOWA, ASSIGNOR TO JOHN ALEXANDER McMILLAN, OF MARSHALLTOWN, IOWA.

POULTRY-FEEDER.

1,376,685. Specification of Letters Patent. Patented May 3, 1921.

Application filed February 28, 1920. Serial No. 362,150.

*To all whom it may concern:*

Be it known that I, W FRANK EASTER, a citizen of the United States of America, and resident of Marshalltown, Marshall county, Iowa, have invented a new and useful Poultry-Feeder, of which the following is a specification.

The object of this invention is to provide improved means for feeding poultry.

A further object of this invention is to provide means for heating or warming feed in an automatic poultry feeder.

A further object of this invention is to provide means for utilizing surplus heat from a poultry fountain to warm feed in an automatic poultry feeder.

A further object of this invention is to provide a poultry feeder with removable legs whereby the altitude of the feeder may be altered at different seasons to accommodate chicks or poults and adult poultry.

My invention consists in the construction, arrangement and combination of elements hereinafter stated and pointed out in the claim and illustrated by the accompanying drawing, in which—

Figure 1 is a side elevation of an automatic poultry feeder together with a conventional poultry fountain, embodying my improvements. Fig. 2 is a cross section of the poultry feeder on the indicated line 2—2 of Fig. 1.

In the construction and arrangement of the devices as shown, the numeral 10 designates the heating chamber and 11 the water magazine or tank having a fount 12, removably mounted on the heating chamber, of a poultry fountain of conventional type. An air outlet 13 is provided for the chamber 10 and air is admitted to said chamber through holes 14 in the bottom of its wall and on the opposite side from the outlet. A lamp, not shown, usually is provided to heat the air in the chamber 10 for the purpose of heating the water in the magazine or tank 11 in order to provide warm water for the poultry in cold weather. A trough 15 preferably made of sheet metal, is mounted on removable legs 16 at a suitable elevation from the floor supporting the legs and fountain. A flue pipe 17 is mounted in and extends longitudinally of the trough 15 and projects at opposite ends from the ends of said trough. The flue pipe also is extended vertically at one end above the other elements of the feeder and one end of said flue pipe, opposite the vertical extension, communicates with the outlet 13 of the heating chamber 10 and is detachable relative thereto. A magazine 18, preferably made of sheet metal, and having a removable and replaceable cover 19 forming one side of its roof, is mounted in and rises from the trough 15 and the lower margins of the side walls of said magazine preferably are spaced from the trough to permit feed to flow by gravity from said magazine into said trough. The magazine is divided into compartments by vertical partitions 20 (dotted lines Fig. 1) extending transversely thereof and the lower ends of said partitions are continued across side portions of the trough 15 as wings 22. Gates 23, one for each side of each compartment, are mounted on the side walls of the magazine and are adapted to be moved manually in vertical planes over the spaces or openings between said side walls and the trough to govern, control and determine the flow of feed from the magazine to the trough. Each gate 23 is formed with a slot 24 and is provided with a bolt 25 extending through the wall of the magazine and through said slot. The head of the bolt is within the magazine and the outer end of the bolt is provided with a washer 26 and a wing nut 27 whereby the gate may be clamped rigidly, in any position in which it may be placed manually, to the wall of the magazine. Thus provision is made for controlling the delivery of various kinds of feed contained in the several compartments at the will of the operator. A stay 28 connects the upper end portion of the flue pipe 17 to one end wall of the magazine.

In practical use the flue pipe provides a draft for the heating chamber 10 and draws heated air therefrom. The heated air traveling through the flue pipe in the trough is surrounded by and embedded in feed flowing from the magazine to said trough and heats said feed by radiation, thus providing warm food in cold weather.

Inasmuch as the poultry using this device are well-grown and of adult character in cold weather, it is convenient for such poultry to feed from the elevated trough 15; the elevation of such trough being made desirable because of its use conjunctively with the heating chamber 10. To accommodate the same device for use by chicks and poults in warm weather, the magazine 11 and fount are removed from the heating chamber and used separately; the heating chamber is removed from the flue pipe 17 and stored; the legs 16 are removed from the trough 15 and the feeder device is placed with the trough on the floor or ground, the legs being stored. Such arrangement reduces the altitude of the fount 12 and trough 15 so as to render it convenient for chicks and poults to use, then. Such arrangement is permitted in warm weather when it is not desired to heat either water or feed.

I claim as my invention—

An automatic poultry feeder formed with removable legs, a flue pipe extending through said feeder, a heating chamber detachably secured to said flue pipe, and a fountain detachably mounted on said heating chamber, said fountain being adapted to be removed and used separately, said heating chamber being adapted to be removed, said legs being adapted to be removed and said feeder being adapted to be used at a lower altitude without said legs.

Signed at Marshalltown, in the county of Marshall and State of Iowa, this 24th day of January, 1920.

W FRANK EASTER.